March 18, 1947.    A. N. LARSON    2,417,559
ANTI-FRICTION BEARING-RETAINER
Filed June 26, 1944    3 Sheets-Sheet 1

Inventor:
Arvid N. Larson
By
Attorneys.

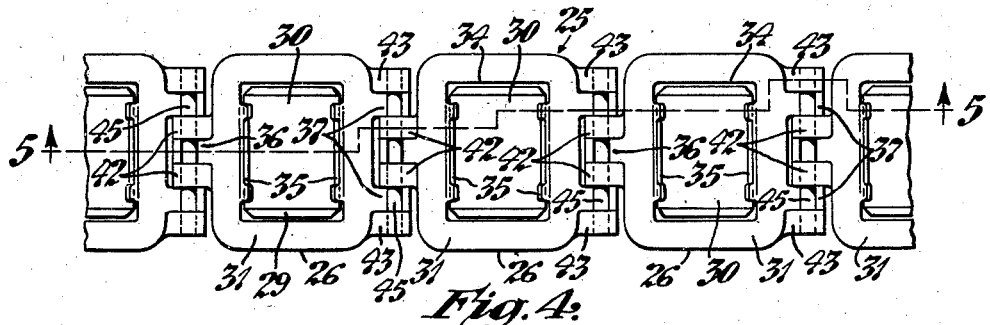
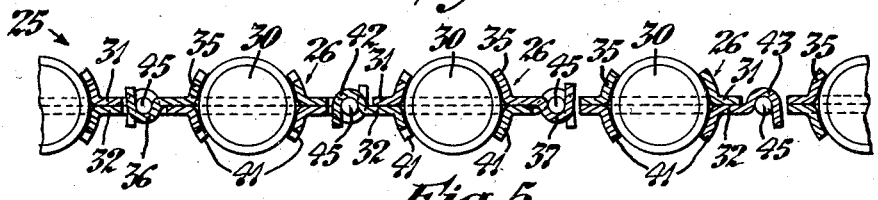
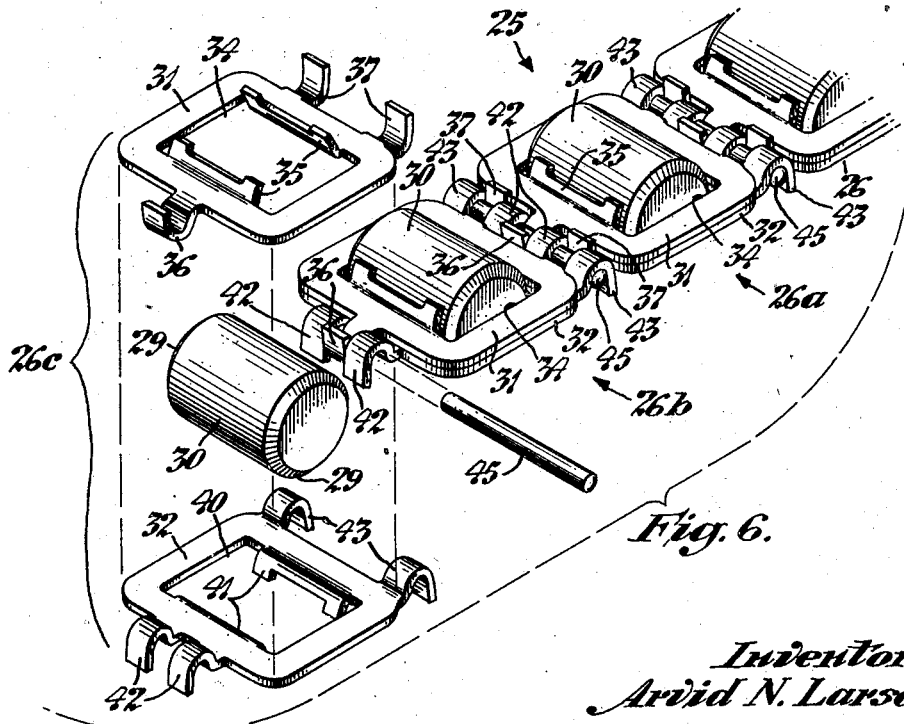

March 18, 1947. A. N. LARSON 2,417,559
ANTI-FRICTION BEARING-RETAINER
Filed June 26, 1944 3 Sheets-Sheet 3

Inventor:
Arvid N. Larson
By
Arrington and White
Attorneys.

Patented Mar. 18, 1947

2,417,559

UNITED STATES PATENT OFFICE 2,417,559

ANTIFRICTION BEARING RETAINER

Arvid N. Larson, Cranston, R. I., assignor, by mesne assignments, to Cread Engineering and Research Company, Cranston, R. I., a corporation of Rhode Island Application June 26, 1944, Serial No. 542,042

6 Claims. (Cl. 308—217)

This invention relates to anti-friction bearings of the roller or ball type used for rotatably supporting various mechanical elements. More particularly, the invention consists in an improved retainer or cage for holding the rollers or balls of such bearings in spaced and alined relationship.

One object of the invention is to provide a bearing-retainer of the type indicated comprising a series of articulated cell-like links for maintaining the rollers or balls in spaced relationship to adapt them to rotatably support the machine elements.

Another object is to provide a retainer of the type indicated which is adapted for use with either radial or axial-thrust bearings and also for other applications.

Another object is to provide an endless bearing-retainer of the type indicated which is adapted for use with cylindrical machine elements of various diameters by joining the required number of cells or links together to form a bearing circle of appropriate size.

Another object is to provide a bearing-retainer of the type indicated in which the rollers or balls are mounted relatively loosely in their respective cells or links to adapt them to float therein and adjust themselves to the contour of the raceway between the machine elements with which they are employed.

Another object is to provide a bearing-retainer of the type indicated in which the individual cells or links are composed of two complementary members with the rollers or balls rotatably mounted therein and embraced thereby.

Another object is to provide in a bearing-retainer of the type indicated means for connecting the two complementary members of each cell or link in assembled relationship, said means also serving to connect the links in articulated relationship.

Another object is to provide a bearing-retainer of the type indicated having its parts adapted for quick assembly without screws, rivets or similar mechanical fastening devices which require the use of special tools and skill or expertness on the part of the workman.

Another object is to provide a bearing-retainer of the type indicated which is extremely simple in construction, economical to manufacture, and efficient in performing its intended functions.

Further objects of the invention are set forth in the following specification which describes several forms of construction of the retainer, by way of example, as illustrated by the accompanying drawings. In the drawings:

Fig. 4 is an enlarged plan view showing a series of the articulated cells or links which form the improved bearing-retainer;

Fig. 5 is a longitudinal sectional view through the bearing-retainer taken in offset planes on line 5—5 of Fig. 4;

Fig. 6 is a composite perspective view of several of the improved cells or links illustrating the manner of assembling the complementary members of each link with a roller embraced therein and connecting the links in articulated relationship to form the complete bearing-retainer;

In the construction of various machines and mechanical apparatus, anti-friction bearings are employed extensively for supporting the rotary elements thereof. Such anti-friction bearings usually comprise a pair of grooved annuli or races between which are revolvably mounted bearing-rollers or balls. The races and rollers, or balls, are assembled to form a complete bearing-unit for building into the machine or apparatus and usually the bearings are manufactured in numerous types and dimensions to meet various requirements. That is to say, each bearing-unit is adapted for use solely with a shaft, turret or other rotary element of a particular size. Because of the fact that the various parts of these bearing-units must be accurately machined to provide for a free rolling action of the rollers or balls in the raceways and to fit a particular machine element, the manufacturing cost of such anti-friction bearings is considerable and thus the cost of the complete machine is materially increased. This is especially true when relatively large bearing-units are employed for rotatably supporting turrets, turntables and similar large, heavy machine elements.

It is the purpose of the present invention to provide an improved anti-friction roller- or ball-bearing which is particularly adapted for use in rotatably supporting relatively large, heavy machine elements. Specifically, the present invention provides means for revolvably mounting the rollers or balls and maintaining them in spaced, alined relationship. The improved retainer for anti-friction bearings of the circular type is preferably in the form of an endless linkage composed of articulated cells or links with each link adapted to mount one or several anti-friction rollers or balls. Each cell or link of the retainer comprises two complementary members assembled in juxtaposition to adapt them to enclose one or more rollers or balls and means are provided for securing the parts of the link together while at the same time pivotally connecting the several links in articulated relationship to form a continuous circular retainer of the required dimensions. The cells or links serve to maintain the rollers or balls in spaced, alined relationship when the assembled retainer is applied to use in either an axial or radial-thrust bearing. The parts of the bearing-retainer may be constructed from sheet-metal stampings and assembled with a minimum of operations without the use of special tools, whereby to render the device extremely light in weight and economical to manufacture.

Figure 1:
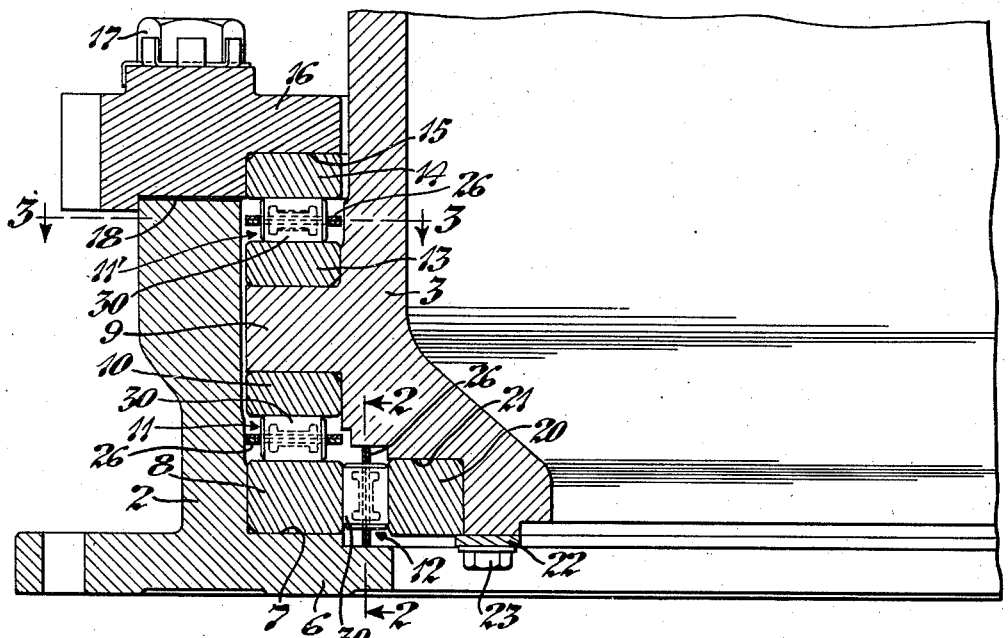
Fig. 1 is a fragmentary sectional view of a turret or other rotary element of a machine or apparatus showing it journaled in a stationary support by means of several roller-bearings incorporating the novel features of the present invention.

Referring to Fig. 1 of the drawings, the present improved anti-friction bearing is herein shown, by way of example, as applied to use in a machine or apparatus of conventional construction, but it is to be understood that it may be employed in a manner other than that herein illustrated. The machine may comprise, as an example, an annular base or support 2 and a cylindrical turret 3 or the like rotatably mounted on the base. The foot of the base 2 may be secured in any suitable manner to a stationary part of the apparatus and, preferably, it is formed with an inwardly-directed flange 6. The upper surface of the flange 6 thus provides a circular support or ledge 7 upon which a hardened ring or annulus 8 is mounted. The ring 8 serves as the lower race for the rollers 30 of a roller-bearing, indicated generally by the reference character 11 and later described in detail.

The turret or other element 3 may take the form of a relatively large cylinder provided with an outer circumferential flange 9. Surrounding the turret 3 and abutting the under side of its flange 9 is a hardened ring 10 which constitutes the upper race of the roller-bearing 11, the ring resting directly upon the rollers 30 of the bearing. The roller-bearing 11 thus supports the weight and downward thrust of the turret 3 to adapt the latter for rotation on the base 2. A second roller-bearing 11', similar to the bearing 11, is employed for reacting against the upward axial thrust of the turret 3. As shown in Fig. 1, the roller-bearing unit 11' is so disposed as to adapt its rollers 30 to revolve between lower and upper rings or races 13 and 14. The lower race 13 is mounted on the upper surface of the flange 9 of the turret 3 while the upper race is fitted to an annular recess 15 formed on the under side of a cap or ring 16. The cap 16 may be fastened to the upper end of the base 2 by means of bolts 17 with shims 18 interposed between the two parts to provide for adjusting the cap to secure the proper spacing between the raceways for the rollers 30 of the two roller-bearing units 11 and 11' to adapt the turret to turn freely on the base. The two roller-bearing units 11 and 11', besides supporting the turret to adapt it to rotate freely on the base 2, also react against the vertical or axial thrust of the turret in either direction.

The radial thrust exerted by the rotating turret may be opposed by a third roller-bearing unit 12. As shown in Fig. 1, the roller-bearing unit 12 is positioned between the inner face of the race 8, previously described, and the outer face of a hardened ring or race 20 held in an annular recess 21 at the bottom of the turret 3. The race 20 may be held in place in the recess 21 by a clamping ring 22 fastened to the under side of the turret 3 by means of screws or bolts 23.

It is to be understood that any suitable form of races may be employed for providing annular tracks or raceways for the bearing-rollers or balls, the present drawings disclosing races of conventional type for purposes of illustration only. The present invention is directed particularly to the retainers or cages for supporting the bearing-rollers or balls in spaced relationship to adapt them to roll on the bearing-races.

Referring to Figs. 2, 4, 5 and 6, the improved roller-bearing retainer 25, such as employed in a radial thrust bearing of the type shown at 12 in Fig. 1, comprises a series of cells or links 26 for spacing and alining the bearing-rollers 30. Each cell or link 26 of the retainer 25 is composed of two juxtaposed complementary plate-like members 31 and 32 for embracing a roller 30. As shown in Fig. 6, the member 31 consists in a plate of rectangular outline, preferably stamped from sheet-metal, and formed with a central rectangular opening 34. Flanged fingers 35 projecting inwardly from the sides of the opening 34 are curved upwardly from the main portion of the member 31 for a purpose to be explained hereinafter. At one end of the member 31 is a centrally-disposed tab which is curved downwardly and upwardly to form a substantially hook-like hinge-loop 36. Projecting from the opposite end of the member 31 are two spaced hinge-loops 37 similar to the loop 36.

The opposite member 32 of the link 26 is of a construction substantially identical with that of the member 31, being formed with a central rectangular opening 40 and curved fingers 41 sloping downwardly from its opposite sides. A pair of spaced tabs at one end of the member 32 project upwardly and then curve downwardly to form hook-like hinge-loops 42, the distance between these loops being substantially equal to the width of the single hinge-loop 36 on the member 31. At the opposite end of the member 32 are similar hinge-loops 43, the space between these loops being dimensioned to permit them to straddle the hinge-loops 37 on the opposite member 31 when the two members are assembled in reverse relationship. It will be understood that whereas the retainer 25 is shown in Figs. 5 and 6 with the links 31 and rollers 30 in horizontal position, when the retainer is applied to use in a radial thrust-bearing such as shown at 12 in Fig. 1 the links and rollers will be disposed in vertical arrangement.

The cylindrical bearing-rollers 30 may be constructed from hardened metal and preferably they are chromium-plated to provide smooth, wear-resistant surfaces. The opposite ends of the rollers 30 may be beveled or chamfered, as indicated at 29 in Fig. 6, to eliminate sharp corners.

The two complementary members 31 and 32 of each cell or link 26 may be assembled in the manner as next explained. With a member 32 in horizontal position as shown at the left in Fig. 6 the bearing-roller 30 is placed in its opening 40 to rest upon the downwardly-sloping fingers 41. The upper member 31 of the link 26 is then superimposed upon the member 32 with the hinge-loops 42 straddling the sides of the loop 36 and the loops 43 straddling the loops 37. With the parts of the cell or link 26 in this relationship, the fingers 35 and 41 of the members 31 and 32 will overlie the periphery of the roller 30 with a slight clearance, thus acting to retain the latter in place in the link while adapting it to rotate and float somewhat freely therein.

To join the complementary members 31 and 32 of the link 26 in assembled relationship with a roller 30 held therein, hinge-pins 45 are inserted through their alined hinge-loops 36, 42 and 37, 43 respectively. This may be accomplished when connecting the several links 26 together to form an endless articulated linkage or retainer 25. For example, one cell or link, indicated by the reference character 26a in Fig. 6, may be connected to a similar link 26b by placing the two links end-to-end with their hinge-loops 36, 42, 37 and 43 interleaved in the manner of a piano hinge. That is to say, the adjacent ends of the links 26a and 26b are brought into juxtaposition to cause the hinge-loops 37 on the link 26b to straddle the sides of the hinge-loops 42 on the link 26a. With the several hinge-loops 36, 42, 37 and 43 of the links 26b and 26a thus brought into alinement, a pin 45 is inserted through the loops of the whole series to hingedly connect the two links together. A cell or link such as indicated by the reference character 26c in Fig. 6 may next be connected to the link 26b in a similar manner, and so on until an endless linkage is provided with the last-assembled link connected to the first one in the series; it being understood that the necessary number of links are connected to form a complete circular retainer 25 of a diameter conforming to that of the bearing-raceway around which the rollers 30 are to revolve.

It will be observed by reference to the drawings that the tabs on the link-members 31 and 32 are made relatively long, see Fig. 5, so that they may be formed into hinge-loops having their arcuate portions disposed at a greater or lesser distance from the ends of the links. This provides for connecting the ends of the links at different distances apart to vary the circumferential spacing of the rollers 30 and the length of the retainer in accordance with requirements. It also will be observed that due to the articulated arrangement of the links of the retainer 25 the several cells or links 26 are adapted to pivot on their connecting hinge-pins 45 whereby the retainer and bearing-rollers will conform to the circular contour of the raceway with which they cooperate when incorporated in a radial-thrust bearing of the type shown at 12 in Fig. 1 of the drawings. Any suitable means may be employed for maintaining the hinge-pins 45 permanently in place in the hinge-loops of the links 26 as by upsetting or heading-over their ends; but when the roller-bearing is applied to use in the manner as shown in Fig. 1, such means are unnecessary as the pins will be prevented from axial displacement by portions of the base 2 and turret 3 which overlie their ends. Through the engagement of the fingers 35 and 41 of the links 26 with the peripheries of the bearing-rollers 30, the links are held in axial relation thereto to prevent them from contacting with the bearing races of the machine or apparatus.

Figure 2:
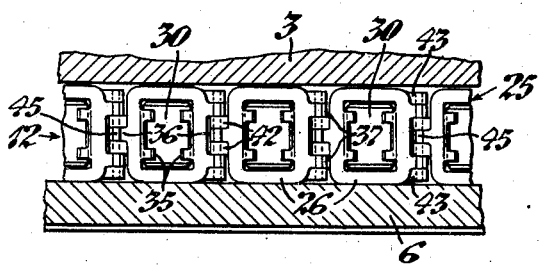
Fig. 2 is a vertical sectional view on line 2—2 of Fig. 1 showing one of the bearings constructed in accordance with the present invention and arranged to oppose the radial thrust of the rotary element.

When roller-bearings are to be used to oppose the axial thrust exerted by a rotary element such as the turret 3, that is, applied as shown at 11 and 11' in Fig. 1, it is essential that the bearing-rollers 30 be disposed radially with respect to the axis of the turret as shown in Fig. 2. To effect this relationship of the bearing-rollers 30 a somewhat different form of link is provided as shown in this latter view. The links 50 differ from the links 26 only insofar as their adjacent ends converge toward the axis of rotation of the machine element to be supported. With this form of construction the alined hinge-loops 36, 42, 37 and 43 and hinge-pins 45 are likewise arranged to converge toward or are positioned radially of the axis of revolution of the bearing to permit the bearing-rollers 30 to revolve in a path concentric thereto.

When relatively heavy turrets, turntables or other machine elements are supported upon roller-bearings they will exert considerable pressure upon the rollers to cause the latter to be depressed slightly into the race upon which they are mounted. Because of this condition, minute indentations may be formed in the race during the period in which the turntable is at rest which may eventually result in vibration of the parts and, most important, prevent the turret from being accurately positioned when it is used as part of a precision instrument. To overcome this tendency, the circumferential spacing of the different bearing-rollers 30 in the bearing-retainer may be irregular so that any minute depressions formed in the race will be unequally spaced and the possibility of the rollers returning to the same depressions minimized. Such irregular spacing of the rollers 30 may be accomplished by folding certain of the hinge-loops of the links 26 closer to or farther away from their ends than in other links in the series.

Figure 7:
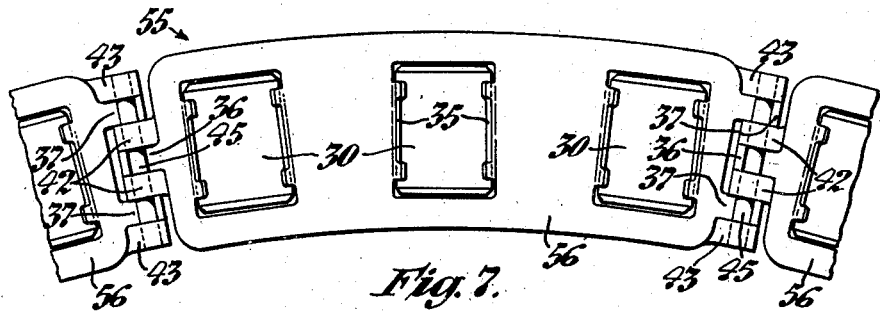
Fig. 7 is a plan view of a modified form of retainer or cage having a plurality of bearing-rollers mounted in each link.

Fig. 7 of the drawings illustrates a roller-retainer 55 of slightly modified construction. In this latter form of retainer the individual links 56 are constructed in the form of relatively long segments to adapt them to mount a plurality of bearing-rollers 30. In all other respects the links 56 are identical in construction with that of the link 26 previously described. This form of link 56 is also adapted for economical manufacture and convenient assembly, but is more limited in its application to axial-thrust bearings because, being formed as a segment of a circle of definite diameter, it can be used only with machine elements having a limited range of dimensions.

Figure 8:
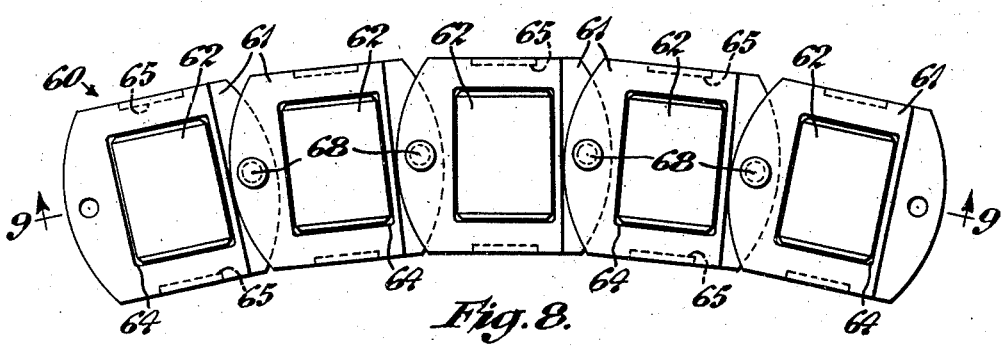
Fig. 8 is a plan view of still another modified form of bearing-retainer composed of individual links connected to swivel, one with respect to another, to conform to the contour of the circular bearing-raceway of the machine elements with which it is used.
Figure 9:
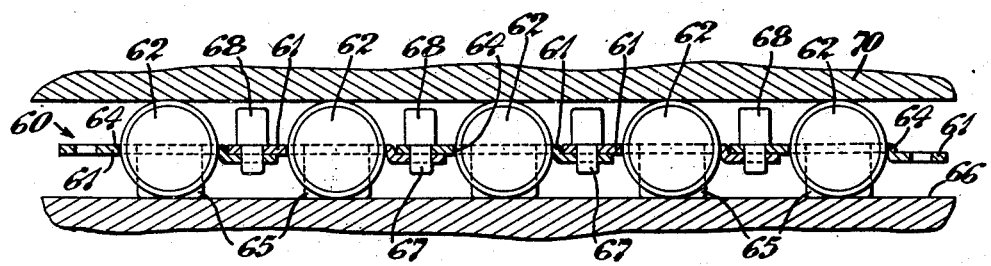
Fig. 9 is a longitudinal sectional view on line 9—9 of Fig. 8.

Figs. 8 and 9 show a modified form of bearing-retainer 60 in which the individual articulated links 61 are swiveled, one with respect to another, to adapt them to adjust themselves to the contour of the bearing surfaces around which their rollers 62 revolve. In the modified form of retainer 60; each link 61 comprises a single plate-like element struck up from sheet-metal to provide arcuate ends and a centrally-disposed rectangular opening 64 for receiving a bearing-roller 62. Depending from both sides of the link 61 are feet 65 which are adapted to rest upon the lower bearing surface 66 of a machine as shown in Fig. 9. One end of each link 61 is offset downwardly to adapt it to underlie the end of the next adjacent link in the series. The terminal portions of the links 61 are perforated to receive the reduced ends 67 of hinge-pins 68 which connect the links in series to form the complete retainer 60. The larger upper portions of the pins 68 are extended to adapt their ends to engage the under side of the element 70 to prevent the retainer from riding upwardly. The links 61 may be connected together in articulated relationship with their feet 65 resting on the bearing surface 66 of the machine and thereafter the bearing-rollers 62 may be placed in the openings 64 of the links to complete the assembly. When the retainer 60 is applied to use for rotatably supporting a turret 70 or the like the under side of the turret will rest directly upon the rollers 62 as shown in Fig. 9.

Figure 10:
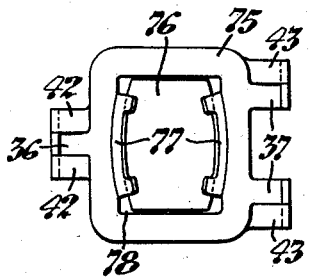
Fig. 10 is a plan view of a further modified form of retainer cell or link adapted to rotatably mount a barrel-shaped bearing-roller.

Fig. 10 illustrates a further modified form of link or cell 75 adapted to rotatably support a bearing-roller 76 of barrel-like form. To adapt the link to accommodate this type of roller the fingers 77 projecting inwardly from its central opening 78 are curved in conformity with the arcuate contour of the periphery of the roller 76. In all other respects, the link or cell 75 is substantially identical in construction with that of the link 26 first described.

Figure 11:
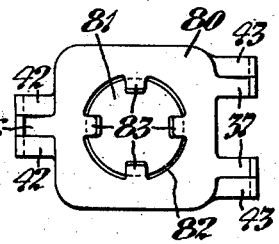
Fig. 11 is a plan view of a retainer cell or link of still further modified form adapted for rotatably mounting a ball.

Fig. 11 illustrates a still further modified form of link or cell 80 of substantially the same construction as the links 26 but adapted to rotatably mount a bearing-ball 81. The link or cell 80 is provided with a circular opening 82 having inwardly-directed tabs or fingers 83 overlying the periphery of the ball 81 to retain the latter in place while adapting it to revolve in the socket thus formed. Such links 80 together with the balls 81 may be connected in series to form a complete bearing-unit and applied to use in a manner similar to that of the roller-bearing units before described.

Figure 3:
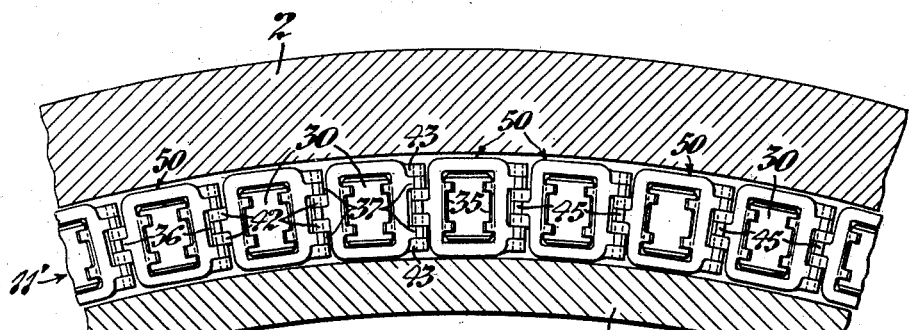
Fig. 3 is a sectional plan view on line 3—3 of Fig. 1 showing the improved bearing as adapted to use for opposing the axial thrust of the rotary element.

The present improved device is further adapted for use as a conveyor belt. For example, in the form shown in Fig. 3 or Fig. 4 it may be mounted to move on a stationary track as the traveling unit of a conveyor; or it may be supported in fixed relationship to adapt objects to be transported therealong riding on its rollers.

It will be observed from the foregoing specification that the present invention provides an improved cage or retainer for the rollers or balls of anti-friction bearings. As one feature of improvement, the composite links of the retainer are of simple construction adapted for economical mass production and quick assembly without the use of special tools. As another feature, the relatively loose pivotal connections between the individual links render the retainer extremely flexible so that it may adjust itself accurately to the contour of the bearing-raceway with which it is used. The articulated link construction of the retainer further provides that any desired number of links may be coupled together to adapt the retainer for bearings of varying diameters. It will be observed further that through the use of the improved construction, retainers may be provided which are adapted for use in either radial or axial-thrust bearings.

While I have herein illustrated and described the improved bearing-retainer as embodied in several preferred forms of construction, by way of example, it is to be understood that other modifications may be made in the structure and arrangement of its parts without departing from the spirit or scope of the invention. Therefore, without limiting myself in this respect, I claim:

1. A retainer for rotatably mounting the anti-friction elements of a bearing in spaced relationship comprising a series of links, each link consisting of a pair of complementary sheet-metal flat-plate-like members superimposed one upon the other and shaped to provide an opening for receiving an anti-friction element, means on said members cooperating to retain the anti-friction element in the opening of the link, interleaving hinge-loops at the ends of the members, and hinge-pins extending through said loops with their axes parallel with the plane of the plate-like members to secure said members together to form a complete link, said hinge-pins also extending through corresponding hinge-loops of adjacent links to connect the links in articulated relationship with the hinge connections located between adjacent anti-friction elements.

2. A retainer for rotatably mounting the anti-friction elements of a bearing comprising a series of links, each link consisting of a pair of sheet-metal rectangular plate-like members superimposed one upon the other in face-to-face relationship and shaped to provide an opening at the center for receiving an anti-friction element, fingers projecting from the edges of openings in the members for overlying the periphery of the anti-friction element to retain it in the link, hinge-loops at the ends of each member arranged in alined relationship when the members are superimposed one upon the other, and hinge-pins extending through the loops at both ends of the members to maintain them in assembled relationship with the anti-friction element in the opening, said hinge-pins extending laterally across the bearing races with their axes parallel with the plane of the plate-like members, said hinge-pins also extending through the loops at the ends of adjacent links in the series to hingedly connect the links in articulated relationship.

3. A retained for rotatably mounting the anti-friction elements of a bearing comprising a series of links, each link consisting of a pair of complementary sheet-metal frame-like members superimposed one upon the other in face-to-face relationship and shaped to provide an opening conforming to the contour of the anti-friction element to adapt it to receive the latter, fingers on each member at the sides of the opening for overlying the periphery of the anti-friction element to retain it in the opening, hook-like hinge-loops at the ends of the members arranged to interleave one with another when the members are assembled in overlying relationship, and hinge-pins extending laterally through the interleaved hinge-loops at each end of the members with their axes parallel with the plane of said members for connecting the members in assembled relationship to form a complete link, said hinge-pins also engaging through the interleaved hinge-loops of adjacent links to hingedly connect the several links of the series in articulated relationship to form an endless retainer.

4. A retainer for rotatably supporting the antifriction elements of a bearing in spaced relationship comprising a series of links, each link consisting of a pair of plate-like members superimposed one upon the other and cooperating to provide a socket for receiving an anti-friction element, spaced tabs at the opposite ends of each member formed to provide oppositely-directed hook-like hinge-loops, said hinge-loops on one member being alined with and straddling those of the other member when the members are superimposed one upon the other, hinge-pins inserted through the loops at opposite ends of the members to retain them in assembled relationship to form a complete link with the anti-friction element mounted therein, said hinge-pins also extending through corresponding hinge-loops of adjacent links in the series to connect the links in articulated relationship, the tabs on each member being of sufficient length to adapt the hinge-loops to be formed at various distances from the ends of the individual links whereby to adjust the spacing of the anti-friction elements in accordance with particular requirements.

5. A retainer for rotatably mounting the anti-friction elements of an axial-thrust bearing in spaced relationship comprising a series of links, each link consisting of a pair of complementary plate-like members superimposed one upon the other, cooperating means on said members forming a socket therebetween for receiving an anti-friction element, hinge-loops at the opposite ends of each member arranged in alinement when the members are superimposed one upon the other and disposed radially of the axis of rotation of the bearing, hinge-pins engaging through the loops at both ends of the members to connect the latter in assembled relationship with an anti-friction element mounted in each complete link, said hinge-pins arranged with their axes in a horizontal plane and projecting radially of the axis of rotation of the bearing and also extending through corresponding radially-disposed alinged loops of adjacent links in a series to connect the several links in articulated relationship to form an endless circular retainer.

6. A retainer for rotatably supporting the anti-friction elements of a bearing comprising a series of composite links, each link consisting of a pair of complementary members superimposed one upon the other and formed to provide an opening in each link for receiving an anti-friction element, means on the members for retaining the anti-friction elements in the openings of the links, hinge-loops at the opposite ends of each member arranged in alinement with one another when the members are placed one upon the other, and hinge-pins extending through the loops with their axes in a plane parallel to the abutting faces of the members to secure the latter in assembled relationship to form a complete link with an anti-friction element mounted therein, said hinge-pins also extending through corresponding hinge-loops at the ends of adjacent links in the series to hingedly connect the several links in articulated relationship.

ARVID N. LARSON.

REFERENCES CITED

The following references are of record in the file of this patent:

UNITED STATES PATENTS

| Number | Name | Date |
| --- | --- | --- |
| 1,241,669 | Schneider | Oct. 2, 1917 |
| 543,718 | Berger | July 30, 1895 |
| 543,719 | Berger | July 30, 1895 |
| 543,720 | Berger | July 30, 1895 |
| 631,393 | Bradshaw | Aug. 22, 1899 |